Patented Feb. 17, 1953

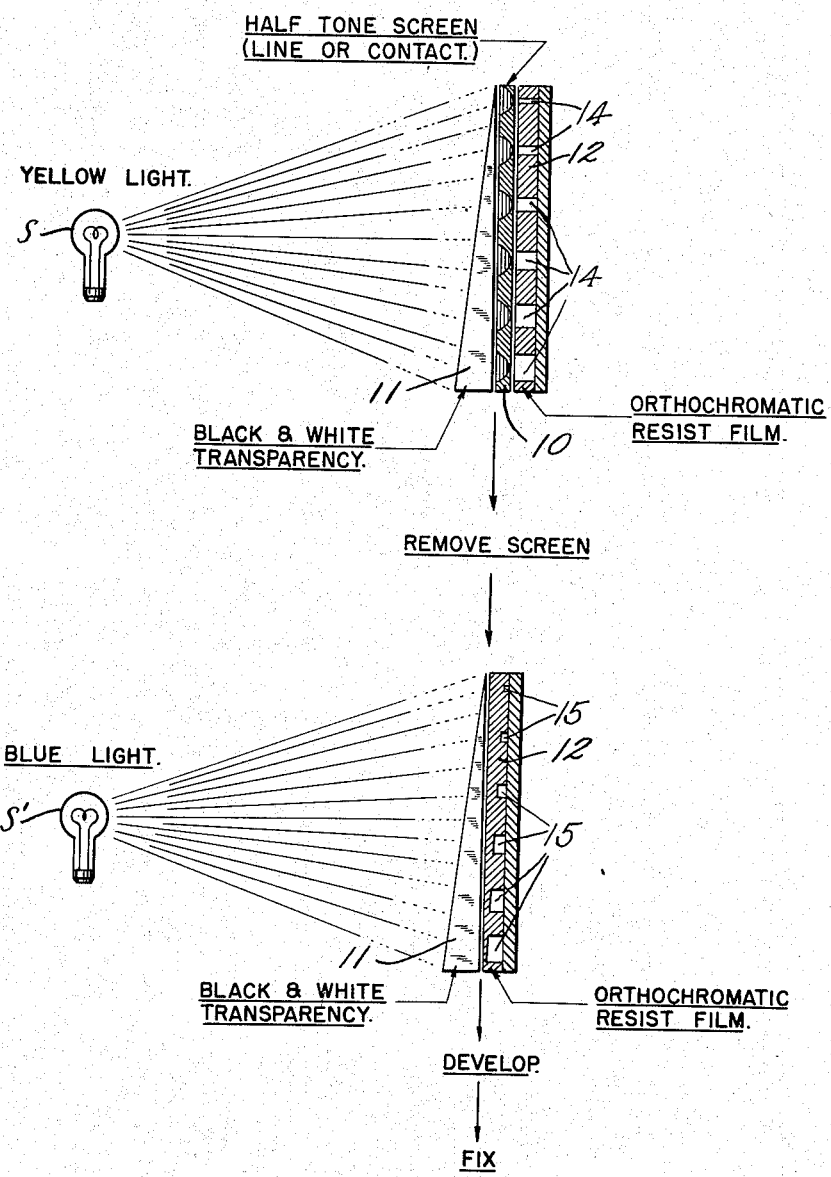

2,628,903

UNITED STATES PATENT OFFICE 2,628,903

PREPARATION OF PRINTING PLATES AND CYLINDERS WITH CHLORO-BROMIDE RESIST-FORMING FILM

Hermann Kott, Verona, N. J., assignor to Publication Corporation, New York, N. Y., a corporation of New York Application June 10, 1950, Serial No. 167,476

3 Claims. (Cl. 95—5.7)

This invention relates to improvements in methods of preparing plates or cylinders for printing presses and the like and it relates more particularly to methods of controlling the contrast and tonal values of the images produced in and with etching resist films of the silver chloro-bromide emulsion type.

Recently, a new type of etching resist film has been developed as a substitute for the well-known carbon tissue for use in the production of printing plates, printing cylinders and the like. The new film consists essentially of a cellulose acetate base strip or sheet having a stripping membrane which carries a relatively thick (as compared with photographic film) chloro-bromide emulsion of the orthochromatic type. The new film, when exposed through a photographic transparency and developed, has the property of varying in its permeability to etching fluid about in inverse proportion to the amount of light striking it. The action of the light on the emulsion thus is very similar to its action on carbon tissue.

The new orthochromatic resist-forming film is easily developed with a pyro or other hardening developer and has a higher light sensitivity than carbon tissue so that the exposure time and the time required to produce a resist can be reduced very substantially. Also, it is more convenient to use because the silver image formed therein faithfully represents the subject matter which can be reproduced on and with the plate or printing cylinder.

One of the difficulties encountered in using the new stripping film is that it is not readily controllable as to contrast and tonal value in the preparation of gravure plates or cylinders and it has too much contrast for commercial printing operations when used in a manner similar to carbon tissue.

The present invention relates primarily to the control of the contrast and other characteristics of the new orthochromatic resist-forming films to enable close control of the tonal values of the image-bearing portions of printing plates or cylinders made with the new material.

I have found that the new orthochromatic resist-forming film has a density exposure curve characterized by a rather extended lower threshold in sensitivity in which a substantial exposure of the film to light results in very little change in the density of the film and, therefore, very little contrast is obtained. Exposures in excess of that required to overcome the initial lack of sensitivity will cause a progressively increasing density and contrast up to a maximum where very little increase in density occurs, regardless of the length of the exposure to light.

Knowing the density-exposure characteristics of the film, I have been able to control the exposure through use of filters or lights of different colors to obtain a very close control of the contrast of the image on the new film and its permeability to etching agents so that very faithful reproductions of the subject matter can be obtained with a minimum of control in the etching operation.

In accordance with the invention, I have found that by exposing the orthochromatic resist-forming material through a photographic transparency, and a screen (half-tone, Eastman orange or magenta contact screen or the like) either with a predominantly yellow light or with a mixture of yellow and blue light, it is possible to produce in the resist-forming material an image of relatively high contrast. Then, by reexposing the material through a continuous tone photographic transparency with a predominantly blue light for a shorter period of time, an image is formed in the low density area of the curve which softens the overall contrast and thereby produces high fidelity of tone throughout the entire range of tonal values of the subject matter.

For a better understanding of the present invention, reference may be had to the accompanying drawing in which the single figure is a diagrammatic illustration of the procedural steps of the method of preparing a resist to be used in the etching of a printing surface, in accordance with the present invention.

A specific example of the method may consist in the preparation from an original subject of a series of standard separation negatives in the usual way, either by means of a color positive and filters or with a three color camera, as may be desired. These negatives can be retouched, if necessary.

Positives are then made from the negatives either by contact printing or in the camera in the usual way and the positives can be retouched, if necessary.

For four color work, all of the positives are provided with register lugs, and the orthochromatic resist-forming film is punched to receive the lugs on the positives so that each film will be in proper register.

In order to print the various separation positives on the resist-forming material, a half-tone or a contact screen 10, such as the Eastman orange or magenta contact screen, is placed between the positive 11 which is represented in the drawing as a wedge, indicating variation in density and the resist-forming film 12. The emulsion side of the screen 10 is placed against the emulsion side of the resist-forming film 12 and the assembly is placed in a vacuum frame to bring all of the elements of the assembly into uniform contact.

The Eastman orange and magenta contact screens have a checkerboard pattern of alternate square transparent areas and square vignetted opaque areas. Each vignetted opaque area actually varies in density from a substantially opaque center dot to a relatively translucent edge portion. The vignetted areas are orange in color in the orange screen and magenta in the magenta screen.

The action of either the orange screen or the magenta screen is essentially the same. Where the screen underlies a relatively transparent section of the positive, the light will pass freely through the transparent areas of the screen and less freely through the translucent borders of the vignetted square areas. Depending upon the exposure, and the transparency of the high-light areas of the positive, the emulsion underlying the screen at the high-light areas may be exposed to light at all places except at the center dots of the vignetted opaque areas. The intensity of the exposure will vary relatively uniformly from the edges to the centers of the opaque areas.

In the shadow tones of the positive, the emulsion will be exposed only through the transparent areas of the screen, while little or no light passes through the vignetted opaque areas. In the shadow tones, the amount of exposed area of the emulsion underlying the transparent areas of the screen will vary with the intensity of the light, so that only a small dot in the center of each portion of the emulsion underlying the transparent squares may be exposed in the deep shadow tones. As a result, the developed negative image on the emulsion will be characterized by alternate opaque and transparent squares of nearly equal areas in the middle tones, small separated transparent substantially square dots in the areas corresponding to the highlights of the positive and large transparent, square dots in the areas corresponding to the deepest shadow tones of the positive. The sizes of the transparent dots will, of course, be proportional to the tones of the image, when the emulsion is properly exposed and are represented diagrammatically in the drawing by the white or non-hatched portions 14 in the film 12.

While the contact screens described above are especially suited to the formation of the desired dot pattern, it will be understood that the ordinary half-tone screens with suitable spacing and exposure can be used to produce a similar pattern.

In the present method, the resist-forming film 12 is exposed by means of a light source S predominantly efficient in yellow light. A light of relatively high intensity is preferred for this operation. For example, a light source of a value of fifty foot candles and an exposure of about sixty seconds is used to carry the exposure to a point where the highlight openings in the resist-forming film are just beginning to close up.

Inasmuch as the exposure is relatively prolonged with a high intensity source, the density of the film is on the steep part of the density-exposure curve and thus maximum contrast is obtained.

After the first exposure has been completed, the contact screen 10 is removed from between the positive 11 and the resist-forming film 12 and they are left in contact with each other. Vacuum is again applied and a continuous tone exposure is flashed onto the resist-forming film in register with the screened undeveloped image using a low intensity light S' which is strong in blue radiations. Satisfactory results have been obtained using a blue light having an intensity of about $\tfrac{1}{10}$ foot candle. This exposure should be relatively short, that is between 15 and 45 seconds, so that its action is on the low density end of the density exposure curve of the film, thereby producing a low contrast continuous tone image. It will be understood that the intensity of illumination and the times of exposure may be varied considerably so long as the exposures (intensity×time) are within the ranges cited above.

At the conclusion of the second exposure, the resist-forming film 12 is removed and developed in a hardening developer of the following type:

Solution A:
  Pyro _____grams__ 2
  Sodium sulfate _____do____ 16
  Water _____liter__ 1
Solution B:
  Sodium carbonate _____grams__ 100
  Water _____liter__ 1

Solutions A and B are mixed immediately before development and development is conducted until the proper tone values are obtained. Any other suitable hardening developer may be used.

The film 12 is then washed and fixed in the usual acid fixing solution and may then be applied to the laydown apparatus for transfer of the strippable emulsion from its backing to the plate or cylinder in the usual way.

At the completion of the developing and fixing operation, the resist-forming film 12 bears an image which closely represents a negative of the subject matter to be produced. This negative, of course, is a screened negative, which is provided with sharply defined clear dots and sharply defined opaque areas. The clear dots, corresponding to the white or non-hatched recesses 15 in the film 12, correspond in permeability and size to the areas of the ink-receiving pockets to be formed in the plate or the cylinder. The relatively clear or transparent dots of the film are permeable to the etching agent and are so related to the image that the etching operation becomes standardized for all subject matters. Essentially, the etching operation consists in applying through the developed and fixed film a 44° Baumé ferric chloride solution for five minutes, followed by successive etchings for equal periods of five minutes with 42° Bé. and 40° Bé. solutions of ferric chloride. The etching operation, together with the controlled contrast of the resist, produces ink-receiving pockets in the plate or cylinder such that the tonal value of the original subject is faithfully produced. The ink-receiving pockets produced in this way are dish-shaped in cross-section. That is, they do not have sides perpendicular to the surface of the plate. They have concave bottoms. This type of recess has been found to be especially suitable for gravure printing as the ink seems to transfer more uniformly from such recesses and a better tonal balance and definition is obtained with them.

A particular advantage of the above method is that the last step from the last tone to white increases in its density about .2 while the other densities stay fairly even in .1 step gradation (the last density step from gray to white is twice as great as the steps in density in the intermediate and dark tones as measured by a density wedge), thereby assuring good detail with brilliant whites in the white or highlight range of the image, and excellent gradation of tones in the shadow and intermediate tone ranges.

Another advantage of the method is that it enables the tones of the several positives used in color work to be balanced very easily. If the several exposures are made as described above, that is, the exposure is stopped just short of the point where the highlight openings or dots close up, the tones of the several resist images are brought very closely into balance. The proper exposure can be determined, of course, by means of step wedges or test strips.

While the above-described method is described as applied to the production of inverted half-tone, four color work, it will be understood that the process is equally applicable to other types of plates and may be used equally well for black and white or monochromatic work. Moreover, the method may be practiced with a photographic transparency having a screened image thereon for the first exposure and a continuous tone transparency of the same subject matter for the second exposure.

Accordingly, the example of the method described above should be considered illustrative and not as limiting the scope of the following claims.

I claim:

1. A method of preparing intaglio type printing plates, cylinders and the like, comprising exposing a high contrast, orthochromatic, silver chloro-bromide resist-forming emulsion to light rays from a predominantly yellow light source through a black and white continuous tone transparency of a subject and a half-tone screen having opaque and transparent areas for a time sufficient to produce a screened image in said emulsion which, when developed, has a high contrast, the exposure being stopped just short of the point where the high-light openings close up, removing the screen, again exposing the emulsion to light rays from a weak predominantly blue light source through said transparency for a sufficient period of time to produce a continuous tone image in such emulsion, which when developed, has low contrast and is in register with said screened image in such emulsion, said exposure from said weak light source being very short as compared with the yellow light exposure so that its action is on the low end of the density exposure curve of the resist-forming emulsion, the yellow light exposure with said screen and the blue light exposure without said screen being in any order, developing said emulsion with a hardening developer, fixing the emulsion, applying the emulsion to an etchable printing surface and etching said surface through said emulsion with the hardened areas thereof as a resist.

2. A method of preparing an intaglio type of printing medium, comprising exposing an orthochromatic stripping film having a base supporting a strippable, high contrast, silver chlorobromide, resist-forming emulsion to light rays from a predominantly yellow light source through a half-tone screen having relatively opaque and transparent portions and a continuous tone black and white transparency of a subject, said exposure being approximately that obtained with a yellow light source of fifty foot candle intensity for a period of sixty seconds, removing the screen, exposing said film to light rays from a predominantly blue light source through said transparency, said exposure being approximately that obtained with said source at an intensity of one-tenth foot candle for fifteen to forty-five seconds, developing said film with a hardening developer, fixing said film, stripping said emulsion from said base, applying it to the surface of said printing medium, and etching said printing medium through said emulsion with the hardened areas thereof as a resist.

3. A method of preparing a printing member having an etched printing surface, comprising exposing an orthochromatic stripping film having a strippable, high contrast, silver chlorobromide, resist-forming emulsion on a supporting base to light rays from a predominantly yellow light source through a half-tone screen having relatively opaque and transparent areas and a continuous tone, black and white transparency of a subject, said exposure being approximately that obtained with said light source at an intensity of fifty foot candles for a period of sixty seconds, removing said screen exposing said film to light rays from a predominantly blue light source through said transparency, said exposure being approximately that obtained with said source at an intensity of one-tenth foot candle for fifteen to forty-five seconds, developing said film with a hardening developer, fixing said film, stripping said emulsion from its supporting base, transferring said emulsion to the surface of said printing medium and etching said printing medium through said emulsion with its hardened areas as a resist for periods of about 5 minutes each with 44° Bé., 42° Bé. and 40° Bé. ferric chloride etching solutions, successively.

HERMANN KOTT.

REFERENCES CITED

The following references are of record in the file of this patent:

UNITED STATES PATENTS

| Number | Name | Date |
|---|---|---|
| 2,304,988 | Yule | Dec. 15, 1942 |

OTHER REFERENCES

"Better Halftones," National Lithographer, November 1941, pp. 12–15.

Grady, "The Photoengravers Bulletin," November 1946, pp. 63–71.